US007633252B2

(12) United States Patent
Maue et al.

(10) Patent No.: US 7,633,252 B2
(45) Date of Patent: Dec. 15, 2009

(54) BIDIRECTIONAL MOTOR STALL PROTECTION CIRCUIT

(75) Inventors: H. Winston Maue, Northville, MI (US); John F. Nathan, White Lake, MI (US); Michael Pajor, Northville, MI (US); Michael Noorman, Jenison, MI (US); John R. Ballard, Midland, MI (US); Jerremy Anderson, St. Clair Shores, MI (US); Paul Kucher, Saginaw, MI (US)

(73) Assignee: Lear Corporation, Southfield, MI (US)

( * ) Notice: Subject to any disclaimer, the term of this patent is extended or adjusted under 35 U.S.C. 154(b) by 164 days.

(21) Appl. No.: 11/106,223

(22) Filed: Apr. 14, 2005

(65) Prior Publication Data

US 2006/0232896 A1 Oct. 19, 2006

(51) Int. Cl.
*H02K 17/32* (2006.01)

(52) U.S. Cl. .................... 318/434; 318/280; 318/283; 318/469

(58) Field of Classification Search .................. 361/31, 361/23; 318/280, 466, 283, 434, 469
See application file for complete search history.

(56) References Cited

U.S. PATENT DOCUMENTS

| | | | | |
|---|---|---|---|---|
| 4,562,387 A | * | 12/1985 | Lehnhoff | 318/285 |
| 4,725,765 A | * | 2/1988 | Miller | 318/434 |
| 5,081,586 A | * | 1/1992 | Barthel et al. | 701/49 |
| 5,151,638 A | * | 9/1992 | Beckerman | 318/434 |
| 5,289,560 A | * | 2/1994 | Abney | 388/811 |
| 5,365,118 A | * | 11/1994 | Wilcox | 327/109 |
| 5,483,135 A | * | 1/1996 | Parks | 318/469 |
| 5,559,375 A | * | 9/1996 | Jo et al. | 307/10.1 |
| 5,572,101 A | * | 11/1996 | Rutkowski et al. | 318/470 |
| 5,675,464 A | * | 10/1997 | Makaran et al. | 361/23 |
| 5,744,925 A | * | 4/1998 | Madsen | 318/590 |
| 6,002,224 A | * | 12/1999 | Stern | 318/280 |
| 6,703,830 B2 | | 3/2004 | Kaste | |
| 6,756,754 B2 | * | 6/2004 | Bent et al. | 318/282 |
| 6,867,563 B2 | * | 3/2005 | Ohshima | 318/434 |
| 6,940,246 B2 | * | 9/2005 | Mochizuki et al. | 318/469 |
| 7,009,352 B2 | * | 3/2006 | Yamamoto et al. | 318/466 |
| 7,218,120 B2 | * | 5/2007 | Shimoyama et al. | 324/523 |
| 2003/0206385 A1 | * | 11/2003 | Lakerdas et al. | 361/23 |

OTHER PUBLICATIONS www.sypris.com, Sypris Test & Measurement/Closed Loop Current Sensors, p. 1.
www.uoguelph.ca, Timer/Oscillator Tutorial, pp. 1-21.
www.4qdtec.com, 4QD Electronics Circuits Reference Archive, pp. 1-2.
Allegro MicroSystems, Inc., General Information, IC Outputs—Terms and Definitions, pp. 1-8.

* cited by examiner

*Primary Examiner*—Bentsu Ro
*Assistant Examiner*—David S Luo
(74) *Attorney, Agent, or Firm*—Brooks Kushman P.C.

(57) ABSTRACT

A stall protection circuit is provided for bidirectional motor operation that is controlled by a half bridge switch that has forward, reverse and off positions. A method of protecting a motor is also disclosed. A Hall effect current sensor may be provided in a stall current protection circuit that engages a latching circuit. The latching circuit is operative to interrupt current flowing to the motor by disabling MOSFETs on opposite sides of the motor. Alternatively, FET voltage from drain to source may be used to measure the current supplied to the motor that is used to engage the latching circuit.

20 Claims, 2 Drawing Sheets

BIDIRECTIONAL MOTOR STALL PROTECTION CIRCUIT

BACKGROUND OF THE INVENTION

1. Field of the Invention

The present invention relates to electrical circuits for protecting an electric motor from damage caused by stalling the motor.

2. Background Art

Small, low current electric motors are used in a myriad of applications in which a reversible drive is required. Examples of some applications include vehicle seat positioning systems, seat recliners, window regulator drives, mirror positioning systems, and the like. For example, a reversible motor may be used in a vehicle seat to control the fore-and-aft positioning of the vehicle seat in a track. The motor is used to adjust the seat forwardly or rearwardly to accommodate a seat occupant. Seats move within tracks between a maximum forward position and a maximum rearward position that is determined by stops defining the length of the track. When the motor drives the seat to either maximum position, the motor may stall if the switch controlling the motor is continued to be actuated after the seat reaches the maximum travel position. Stalling the electric motor may cause damage to the motor.

Prior art solutions to the problem of damage caused to motors by stalling include providing positive temperature coefficient (PTC) devices or circuit breakers in the motor drive control circuit to protect the electrical motor. PTC devices may tend to degrade with time. Circuit breakers are thermal devices that are subject to hysteresis effects that may cause intermittent seat operation. For example, if the switch is held until the motor stalls after the seat has been moved to maximum travel position, the circuit breaker through internal heating interrupts the supply of current to the motor. The circuit breaker cannot be reset until its temperature drops and resets the circuit breaker which may be perceived as a malfunction by the seat occupant.

Applicants' invention is directed to providing a simple and effective integrated motor control that protects the motor from damage in the event the motor stalls. Applicants' invention provides a system that has an adjustable threshold current level and also provides a robust system that may be repeatedly activated without degradation or adverse hysteresis effects. Applicants' invention is summarized below.

SUMMARY OF THE INVENTION

According to one aspect of the present invention, a stall protection circuit is provided for a motor. The circuit comprises a manual switch having an off position, a forward position, and a reverse position that is used to control an electric motor. A current sensor is provided that senses the flow of current through the motor and produces a first signal representative of the level of current flowing through the motor. A stall current detection circuit receives the first signal and compares the first signal to a threshold value. If the first signal is above the threshold value, a second signal is generated. A latching circuit receives the second signal and shuts off the motor.

According to another aspect of the present invention, a stall protection circuit is provided that includes a manually actuated switch that controls an electric motor. A switch controller senses the level of current flowing through the motor and provides a current signal representative of the sensed level of current. A stall current detection circuit receives the current signal and compares the current signal to a threshold value. A fault signal is provided if the current value exceeds the threshold value. A latch circuit receives the fault signal and opens at least one motor protection switch that is operatively connected to the motor.

Other aspects of the invention relate to specific implementations of the above stall protection circuits. One such aspect is that the manual switch is a half bridge circuit. Another aspect of the stall protection circuit is that a Hall effect current sensor may be used to provide a voltage output that is proportional to the current supplied to the motor. The latching circuit may be used to shut off the motor until the manual switch is in the off position. The stall protection circuit may comprise a pair of field effect transistors, each of which are operatively connected to one of two opposites sides of the motor. The field effect transistor drain to source voltage on each side of the motor are compared to detect stalling of the motor. The latch circuit may be powered by a power supply that is interrupted when current flow to the motor is interrupted. The latch circuit may be connected to a pair of field effect transistors on opposite sides of the motor.

According to another aspect of the present invention, a method of protecting an electric motor against damage caused by stalling is provided. The method includes sensing the level of current supplied to the motor. The sensed level of current provided to the motor is then compared to a threshold value. An interrupt signal is sent to a latch circuit if the sensed level of current exceeds the threshold value. The flow of current to the motor is interrupted when the interrupt signal is received from the latch circuit to protect the motor from damage.

According to other aspects of the invention as they relate to the method, the method may further comprise providing a manual switch actuator that is held in to cause the motor to turn in either a forward or a reverse direction. The motor may be caused to stall if the switch actuator is held in until the motor exceeds a maximum limit. The latch circuit remains latched until the switch is released. The latch circuit is powered by a power supply that is interrupted when current flow to the motor is interrupted.

According to other aspects of the method, the sensing step may be performed by a Hall effect sensor that produces a voltage signal that is proportionate to the level of current supplied to the motor.

Alternatively, the sensing step may be performed by field effect transistors each of which are operatively connected to one of two opposite sides of the motor. The field effect transistor drain to source voltage on each side of the motor are compared in the sensing step. A half bridge may be provided in the motor power circuit.

Other aspects of the invention will be better understood in view of the attached drawings and following detailed description of the preferred embodiment of the invention.

DETAILED DESCRIPTION OF THE PREFERRED EMBODIMENTS

Figure 1:
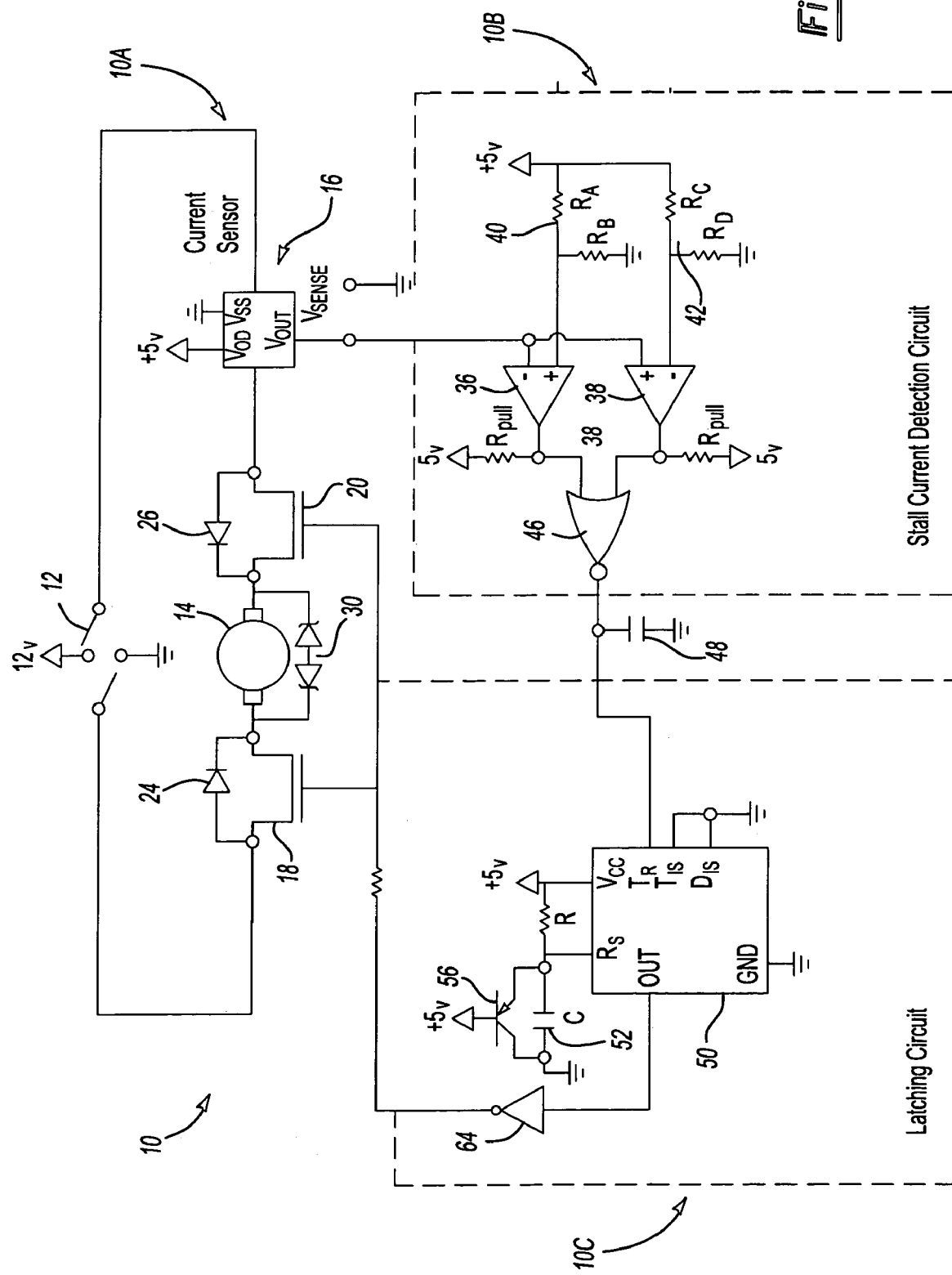
FIG. 1 is a circuit diagram of a stall current detection circuit based on a Hall effect current sensor.

Referring to FIG. 1, one embodiment of a stall current protection circuit is generally referred to by reference numeral 10. The stall current protection circuit 10 includes a motor drive circuit portion 10A, a stall current detection circuit portion 10B and latching circuit portion 10C.

The motor drive circuit portion 10A includes a half bridge switch 12 that has forward, reverse, and off positions. The half bridge switch 12 is a bipolar power-driver output. A motor 14 is controlled by half bridge switch 12 that switches the motor 14 for operation in a forward mode, reverse mode, and turns the motor off. A Hall effect current sensor 16 is a low current Hall effect current sensor that may sense current on PCB traces, and the like. The current sensor 16 senses the level of current provided to the motor 14 and produces a voltage output that is proportional to the sensed current.

A pair of forward N channel MOSFETs 18 and 20 are provided on opposite sides of the motor 14. The FETs 18 and 20 function as switches that are connected to each of the brushes of the motor 14. Reverse diodes 24 and 26 are provided for FETs 18 and 20. The reverse diodes conduct current, one at a time, with current flowing through the diode on the high side of the switch, through the motor, and through the low side FET. Depending on the polarity of the current supplied to the motor, the current flow operates the motor in either its forward or reverse mode. Zener diodes 30 are connected across the motor 14 to protect the motor from excess voltage on either side of the motor that may appear when the circuit is interrupted by one of the FETs. Voltage spikes are caused by the tendency of the motor to continue rotation after current flow to the motor is interrupted.

The stall current detection circuit portion 10B receives voltage from the current sensor 16 that is applied to comparators 36 and 38. The voltage is provided to the negative pole of comparator 36 and the positive pole of the comparator 38. By this arrangement, one of the comparators is operative regardless of the direction of current flow in the motor drive portion of circuit 10A. The voltage in comparator 36 is compared to the output of voltage divider 40 that is used to set the threshold value. Similarly, comparator 38 is connected to voltage divider 42 that sets the threshold value. If the threshold values are exceeded in either of the comparators 36 and 38, an output is provided to NOR gate 46. Nor gate 46 provides a logic output based upon comparison of the output of the comparators 36 and 38. If either of the outputs provided to the NOR gate 46 are high, it is determined that the current through the motor 14 has exceeded the threshold value and circuit 10B determines that the motor 14 is stalled. The NOR gate provides a signal to the latching circuit portion 10C to engage the latch. A capacitor 48 is provided for the output of the NOR gate 46 for noise suppression.

Latching circuit portion 10C is built around a 555 timer IC 50. A latching circuit is required because once the detection circuit determines that the motor 14 is stalled, if the motor is turned off there is no current supplied to the motor and the detection circuit will no longer prevent motor operation. The latch circuit locks out the motor by holding the FETs off until the switch is released. IC 50 is connected to a capacitor 52 that is used to initialize the MOSFETs 18 and 20 to their on state. This also allows the reset pin of IC 50 to be charged. A PNP transistor 56 bridges the capacitor 52. Transistor 56 is a bipolar junction transistor (BJT) that discharges the capacitor and resets the IC 50. Upon receiving the output from the NOR gate 46, the IC 50 produces an output to an inverter 64. The output of the IC 50 is a high output that is inverted by the inverter to a zero that is provided to FETs 18 and 20. This functions to turn off the MOSFETs 18 and 20 and interrupts the supply of current to the motor 14.

Figure 2:
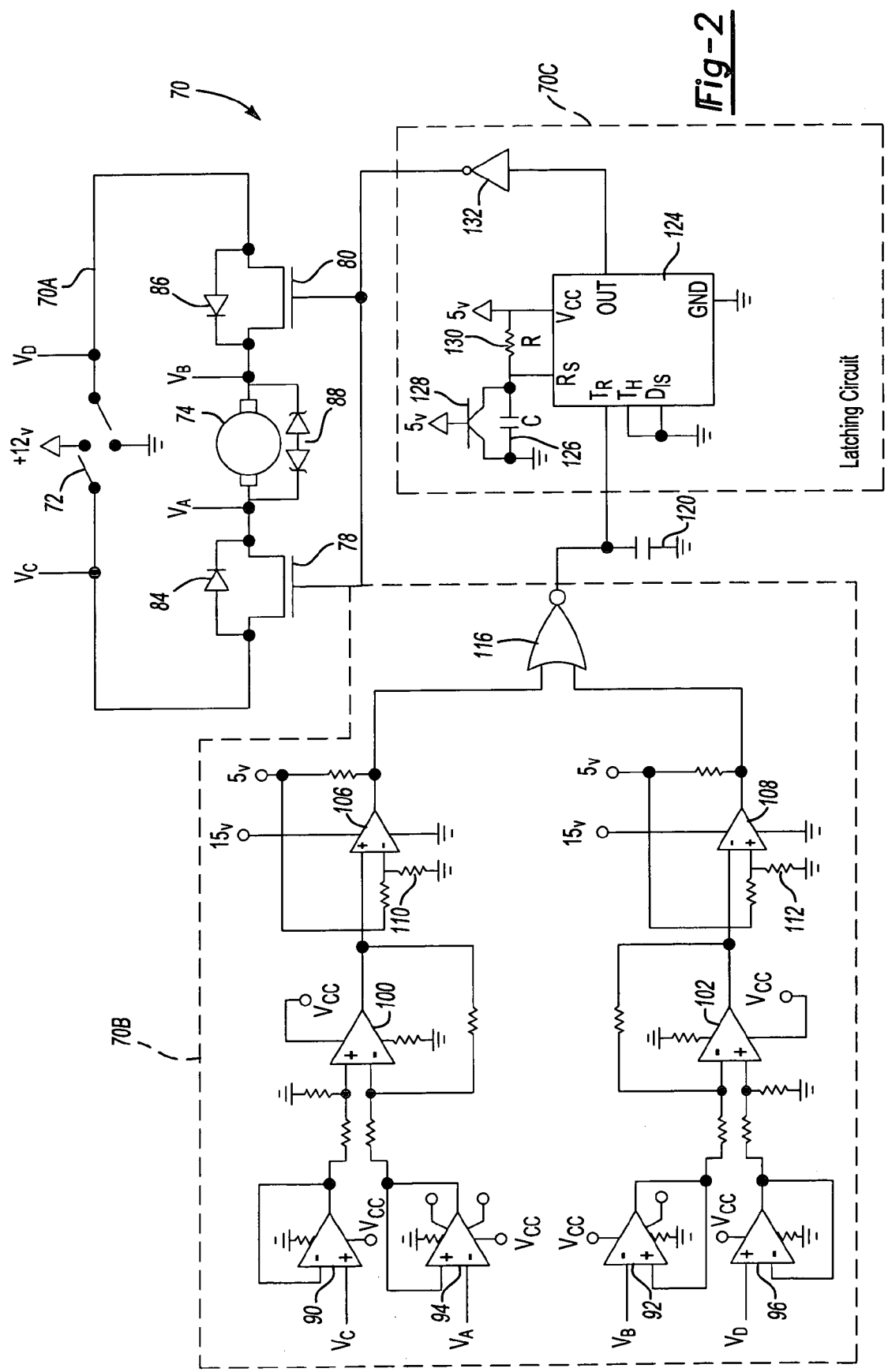
FIG. 2 is a circuit diagram of a stall current detection circuit based on FET voltage from drain to source for measuring current provided to the motor.

Referring to FIG. 2, another embodiment of a stall current protection circuit is generally referred to by reference numeral 70. The stall current protection circuit 70 includes a motor drive circuit portion 70A, a stall current detection circuit portion 70B and latching circuit portion 70C.

The motor drive portion 70A includes a half bridge switch 72 that has a forward, reverse, and off positions. A motor 74 is controlled by half bridge switch 72 that switches the motor 74.

Two MOSFETs 78 and 80 are provided on opposite sides of the motor 74. The FETs 78 and 80 function as switches that are connected to each of the brushes of the motor 74. Reverse diodes 84 and 86 are provided for FETs 78 and 80. The reverse diodes conduct current through the high side of the diode 84 or 86, through the motor 74, and through the low side FETs 78 or 80. Two Zener diodes 88 are connected across the motor 74 to protect the motor from excessive voltage on either side of the motor 74 that may appear when the circuit is interrupted by one of the FETs.

In stall current detection circuit portion 70B, voltages $V_A$ and $V_B$ are taken from opposites sides of the motor 74. Input $V_C$ is supplied to operational amplifier 90 while input $V_B$ is supplied to operational amplifier 92. Voltage from the switch 72 is provided to operational amplifier 94 at $V_A$ and to operational amplifier 96 at $V_D$. Operational amplifiers 90, 92, 94 and 96 act as unity gain buffers for the voltages received from the switch 72 and from opposite sides of the motor at $V_A$ and $V_B$. The operational amplifiers function to isolate the motor 74 from the sensing circuit 70B. The outputs of the operational amplifiers 90 and 94 are provided to operational amplifier 100 that compares voltage $V_A$ to the switch voltage $V_C$. Operational amplifier 100 subtracts the voltages and determines the voltage difference across FET 84. Operational amplifier 102 determines the voltage difference across FET 86 in a similar manner. The voltage difference output of operational amplifier 100 is provided to comparator 106. The voltage difference output of operational amplifier 102 is provided to comparator 108. Comparators 106 and 108 compare the voltage differences to voltage divider networks 110 and 112, respectively, that set the threshold for detecting stall current levels. If either of the outputs of comparators 106 and 108 is high, the outputs provided to the NOR gate 116 cause the NOR gate to signal the latching circuit portion 70C. The output of the NOR gate 116 may be provided with a capacitor 120 for noise suppression.

Latching circuit portion 70C includes IC 124 connected to a capacitor 126 that is used to initialize the MOSFETs 78 and 80 to their on state. This also allows the reset pin of IC 124 to be charged. A PNP transistor 128 bridges the capacitor 126. Transistor 128 discharges the capacitor and resets the IC 124. Upon receiving the output from the NOR gate 116, the IC 124 sends an output to an inverter 132. The output of the IC 124 is high, but it is inverted by the inverter 132 to a zero that is provided to FETs 78 and 80. This functions to turn off the MOSFETs 78 and 80 and interrupts the supply of current to the motor 74.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A stall protection circuit for use with a motor comprising:
   a switch for controlling powering of the motor, the switch being operable to first, second, and third states, the first state powering the motor with current flowing in a forward direction, the second state powering the motor with current flowing in a reverse direction, and the third state preventing powering of the motor;

a single current sensor configured to sense current flowing in both of the forward and reverse directions;

a stall detection circuit configured to compare current sensed by the single current sensor to a current threshold and to output a first signal if the current is less than the threshold and to output a second signal if the current is greater than the threshold;

a first switch connected on one side of the motor and a second switch connected to an other side of the motor, each switch being controllable to an open or closed position; and a latching circuit configured to receive the first and second signals and for connecting or disconnecting the motor from the powering associated with the first or second state depending on whether the first or second signal is received, the latching circuit connecting the motor by closing both switches when the first signal is received and disconnecting the motor by opening at least one of the switches when the second signal is received.

2. The circuit of claim 1 further comprising a first diode connected across the first switch and a second diode connected across the second switch, the first diode preventing current flow in the forward direction and the second diode preventing current flow in the reverse direction.

3. The circuit of claim 2 wherein the latch circuit opens both of the switches if the second signal is received.

4. The circuit of claim 2 farther comprising two diodes connected in series across the motor and between both of the switches and diodes.

5. The circuit of claim 1 wherein the stall detection circuit includes a first comparator for comparing current flowing in the forward direction to the current threshold and a second comparator for comparing the current flowing in the reverse direction to the current threshold.

6. The circuit of claim 5 wherein the first comparator outputs a first value if the current in the forward direction is less than the current threshold or the current is in the reverse direction and a second value if the current in the forward direction is greater than the current threshold.

7. The circuit of claim 6 wherein the second comparator outputs the first value if the current in the reverse direction is less than the current threshold or the current is in the forward direction and the second value if the current in the reverse direction is greater than the current threshold.

8. The circuit of claim 7 wherein the stall detection circuit includes a comparator for comparing the first value to the second value, the comparator issuing the first signal if both of the comparators output the first value and the second signal if either one of the comparators outputs the second value.

9. The circuit of claim 1 wherein the stall detection circuit determines a stall condition if the current is greater than the threshold and without sensing a speed of the motor.

10. The circuit of claim 1 wherein stall detection circuit is unable to output the second signal unless the switch is held in the first or second states.

11. A stall protection circuit for use with a motor comprising:

a switch for controlling powering of the motor, the switch being operable to first, second, and third states, the first state powering the motor with current flowing in a forward direction, the second state powering the motor with current flowing in a reverse direction, and the third state preventing powering of the motor;

a first switch connected on one side of the motor and a second switch connected to an other side of the motor, each switch being controllable to an open or closed position;

a stall detection circuit configured to simultaneously compare a voltage drop across each of the switches to a threshold and to output a first signal if the voltage drop is less than the threshold and to output a second signal if the voltage drop is greater than the threshold; and a latching circuit configured to receive the first and second signals and for connecting or disconnecting the motor from the powering associated with the first or second state depending on whether the first or second signal is received, the latching circuit connecting the motor by closing both switches when the first signal is received and disconnecting the motor by opening at least one of the switches when the second signal is received.

12. The circuit of claim 11 further comprising a first diode connected across the first switch and a second diode connected across the second switch, the first diode preventing current flow in the forward direction and the second diode preventing current flow in the reverse direction.

13. The circuit of claim 12 wherein the latch circuit opens both of the switches if the second signal is received.

14. The circuit of claim 12 further comprising two diodes connected in series across the motor and between both of the switches and the diodes.

15. The circuit of claim 11 further comprising:

the stall detection circuit including a first pair of amplifiers for amplifying a first sensed voltage and a second sensed voltage and a second pair of amplifiers for amplifying a third sensed voltage and a fourth sensed voltage;

wherein the first and second sensed voltages respectively correspond with sensed voltage on first and second sides of the first switch;

wherein the third and fourth sensed voltages respectively correspond with sensed voltage first and second sides of the second switch; and wherein the stall detection circuit relies on the amplified sensed voltages in determining the first and second signals.

16. The circuit of claim 15 wherein the stall detection circuit further includes operational amplifiers connected to outputs of the first and second pairs of amplifiers, the operational amplifiers configured to calculate the voltage drop across the switches based on the amplified sensed voltages.

17. The circuit of claim 16 wherein the stall detection circuit includes a first comparator for comparing the voltage drop across the first switch to the threshold and a second comparator for comparing the voltage drop across the second switch to the threshold, the first and second signals being determined from the outputs of the first and second comparators.

18. A seating system comprising:

a switch for controlling movement of a motor used to position the seat between stops included on opposite ends of a seat rail, the switch being operable to first, second, and third states, the first state moving the seat forwardly with current flowing through the motor in a forward direction, the second state moving the seat rearwardly with current flowing through the motor in a reverse direction, and the third state preventing movement of the seat by preventing current flow through the motor, wherein the current flowing in the forward directions has a forward polarity opposite to a reverse polarity of the current flowing in the reverse direction;

a stall detection circuit configured to disconnect power to the motor when the seat abuts one of the stops, the stall detection circuit has a first comparator configured to compare current flowing with the forward polarity to a current threshold and a second comparator configured to compare current flowing with the reverse polarity to the current threshold and to output a signal if the current associated with either one of the forward and reverse polarities is greater than the threshold; and a latching circuit configured to disconnect power to the motor upon receipt of the signal.

19. The system of claim 18 further comprising;

a first switch connected on one side of the motor and a second switch connected to an other side of the motor;

a first diode connected across the first switch and a second diode connected across the second switch, the first diode preventing current flow in the forward direction and the second diode preventing current flow in the reverse direction wherein the stall detection circuit opens both of the switch to disconnect power to the motor; and wherein both of the switches must be closed to allow current to flow through the motor.

20. The system of claim 19 wherein stall detection circuit is unable to output the second signal unless the seat abuts one of the stops and the switch is held in one of the first or second states.

* * * * *

UNITED STATES PATENT AND TRADEMARK OFFICE
CERTIFICATE OF CORRECTION

| | | |
|---|---|---|
| PATENT NO. | : 7,633,252 B2 | Page 1 of 1 |
| APPLICATION NO. | : 11/106223 | |
| DATED | : December 15, 2009 | |
| INVENTOR(S) | : H. Winston Maue et al. | |

It is certified that error appears in the above-identified patent and that said Letters Patent is hereby corrected as shown below:

Column 5, Line 30, Claim 4:

Delete "farther" and insert -- further --.

Column 6, Line 37, Claim 15:

After "voltage" and before "first" insert -- on --.

Column 8, Line 6, Claim 19:

Delete "switch" and insert -- switches --.

Signed and Sealed this

Ninth Day of February, 2010

David J. Kappos
*Director of the United States Patent and Trademark Office*